(12) United States Patent
Inagaki et al.

(10) Patent No.: US 8,003,255 B2
(45) Date of Patent: Aug. 23, 2011

(54) NONAQUEOUS ELECTROLYTE BATTERY, LITHIUM TITANIUM COMPOSITE OXIDE AND BATTERY PACK

(75) Inventors: Hiroki Inagaki, Kawasaki (JP); Yasuhiro Harada, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 864 days.

(21) Appl. No.: 11/937,042

(22) Filed: Nov. 8, 2007

(65) Prior Publication Data

US 2008/0113264 A1   May 15, 2008

(30) Foreign Application Priority Data

Nov. 10, 2006  (JP) ................................. 2006-305285

(51) Int. Cl.
*H01M 10/40* (2006.01)
(52) U.S. Cl. .............. 429/231.1; 429/231.5; 252/520.21
(58) Field of Classification Search .................. None
See application file for complete search history.

(56) References Cited

U.S. PATENT DOCUMENTS

| 2007/0009794 A1* | 1/2007 | Takami et al. ................ 429/184 |
| 2007/0009798 A1* | 1/2007 | Inagaki et al. ............. 429/231.1 |
| 2008/0078594 A1 | 4/2008 | Harada et al. |

FOREIGN PATENT DOCUMENTS

| JP | 10-247496 | 9/1998 |
| JP | 2001240498 | 9/2001 |
| JP | 2002274849 | 9/2002 |

OTHER PUBLICATIONS

Korean Office Action dated May 15, 2009 corresponding to U.S. Appl. No. 11/937,042, filed Nov. 8, 2007.
Korean Office Action dated Oct. 9, 2009 corresponding to U.S. Appl. No. 11/937,042, filed Nov. 8, 2007.
Chinese Office Action dated May 15, 2009 corresponding to U.S. Appl. No. 11/937,042, filed Nov. 8, 2007.

* cited by examiner

*Primary Examiner* — John S Maples
(74) *Attorney, Agent, or Firm* — Turocy & Watson, LLP (57) ABSTRACT

A nonaqueous electrolyte battery is provided and includes: a negative electrode including a lithium titanium composite oxide showing an X-ray diffraction pattern in which each of main peak intensities of rutile $TiO_2$, anatase $TiO_2$ and $Li_2TiO_3$ is 5 or less with respect to a main peak intensity of ramsdellite lithium titanate of 100; a positive electrode; and a nonaqueous electrolyte.

12 Claims, 4 Drawing Sheets

NONAQUEOUS ELECTROLYTE BATTERY, LITHIUM TITANIUM COMPOSITE OXIDE AND BATTERY PACK

The present application is based upon and claims the benefit of priority from Japanese Patent Application No. JP2006-305285 filed on Nov. 10 of 2007, the entire disclosure of which is incorporated herein by reference.

BACKGROUND OF THE INVENTION i) Field of the Invention

The present invention relates to a lithium ion nonaqueous electrolyte battery, a lithium titanium composite oxide, and a battery pack.

ii) Related Art

A nonaqueous electrolyte battery which performs charge and discharge actions as a result of transfer of lithium ions between a negative electrode and a positive electrode has been actively researched and developed as a high-energy density battery.

A nonaqueous electrolyte battery using a lithium-transition metal composite oxide as a positive electrode active material and using a carbonaceous substance as a negative electrode active material has currently been commercialized. In relation to the lithium-transition metal composite oxide, Co, Mn, Ni, and the like, is usually used as transition metal.

Attention has been recently paid to a lithium titanium composite oxide exhibiting a higher Li absorption-release potential than that of a carbonaceous substance. The lithium titanium composite oxide has advantages that lithium metal is not deposited in principle at the lithium absorption-release potential and that the composite oxide is superior in terms of quick recharge and low-temperature performance.

Of the lithium titanium composite oxides, spinel lithium titanate [a composition formula $Li_{4+x}Ti_5O_{12}$ ($0 \leq x \leq 3$)] has especially gained attention on the ground that a volumetric change developing during charge and recharge periods is small and that superior reversibility is achieved. However, the theoretical capacity of spinel lithium titanate is 175 mAh/g, and there are limitations to an increase in capacity.

In addition to lithium titanate having a spinel crystalline structure, a lithium titanate compound having a ramsdellite crystalline structure has also been known (JP-A-10-247496 (KOKAI)). The theoretical capacity of ramsdellite lithium titanate is 235 mAh/g and is greater than that of spinel lithium titanate. Therefore, an increase in capacity can be expected theoretically.

SUMMARY OF THE INVENTION

An object of an illustrative, non-limiting embodiment of the invention is to provide a lithium titanium composite oxide of large capacity, a nonaqueous electrolyte battery, and a battery pack.

According to a first aspect of the invention, there is provided a nonaqueous electrolyte battery including:
a negative electrode including a lithium titanium composite oxide showing an X-ray diffraction pattern in which each of main peak intensities of rutile $TiO_2$, anatase $TiO_2$ and $Li_2TiO_3$ is 5 or less with respect to a main peak intensity of ramsdellite lithium titanate of 100;
a positive electrode; and
a nonaqueous electrolyte.

According to a second aspect of the invention, there is provided a nonaqueous electrolyte battery including:
a negative electrode including a lithium titanium composite oxide showing an X-ray diffraction pattern in which each of main peak intensities of rutile $TiO_2$, anatase $TiO_2$ and $Li_2TiO_3$ is 5 or less with respect to a total of main peak intensities of ramsdellite lithium titanate and spinel lithium titanate of 100;
a positive electrode; and
a nonaqueous electrolyte.

According to a third aspect of the invention, there is provided a lithium titanium composite oxide showing an X-ray diffraction pattern in which each of main peak intensities of rutile $TiO_2$, anatase $TiO_2$ and $Li_2TiO_3$ is 5 or less with respect to a main peak intensity of ramsdellite lithium titanate of 100.

According to a fourth aspect of the invention, there is provided a battery pack including a plurality of nonaqueous electrolytic batteries, the nonaqueous electrolyte batteries include:
a negative electrode including a lithium titanium composite oxide showing an X-ray diffraction pattern in which each of main peak intensities of rutile $TiO_2$, anatase $TiO_2$ and $Li_2TiO_3$ is 5 or less with respect to a main peak intensity of ramsdellite lithium titanate of 100;
a positive electrode; and
a nonaqueous electrolyte.

According to a fifth aspect of the invention, there is provided a battery pack including a plurality of nonaqueous electrolytic batteries, wherein the nonaqueous electrolyte batteries include:
a negative electrode including a lithium titanium composite oxide showing an X-ray diffraction pattern in which each of main peak intensities of rutile $TiO_2$, anatase $TiO_2$ and $Li_2TiO_3$ is 5 or less with respect to a total of main peak intensities of ramsdellite lithium titanate and spinel lithium titanate of 100;
a positive electrode; and
a nonaqueous electrolyte.

DETAILED DESCRIPTION OF THE INVENTION

As a result of assiduous studies conducted by the present inventors, the followings are found.

The theoretical capacity of ramsdellite lithium titanate is 235 mAh/g and is greater than that of spinel lithium titanate. However, generation of ramsdellite lithium titanate requires high-temperature heat treatment in excess of 1000° C. In order to hold a product material at a room temperature, quenching of the material from such a high temperature is required. For these reasons, when large volumes of ramsdellite lithium titanate are synthesized by use of a kiln, or the like, a portion of a ramsdellite phase is phase-separated into spinel lithium titanate ($Li_4Ti_5O_{12}$) and rutile $TiO_2$ (r-$TiO_2$) in the kiln during firing. Since the capacity of an impurity phase is small, the effective capacity of a resultant lithium titanate composite oxide is eventually reduced. Accordingly, difficulty is encountered in producing a lithium titanate composite oxide which contains a small volume of the impurity phase and, as a principal phase, ramsdellite lithium titanate of large effective capacity.

According to an aspect of the invention, a lithium titanium composite oxide of large capacity, a nonaqueous electrolyte battery, and a battery pack can be provided.

Exemplary embodiments of the invention will be described hereunder by reference to the drawings. Configurations common to the embodiments are assigned the same reference numerals, and their repeated explanations are omitted. Further, the drawings are diagrams for assisting explanations and comprehension of the present invention. Devices are in some points different from an actual device in terms of a shape, a size, and a ratio. However, the design of the device can be changed, as necessary, in consideration of the following descriptions and known techniques.

First Embodiment

Figure 1:
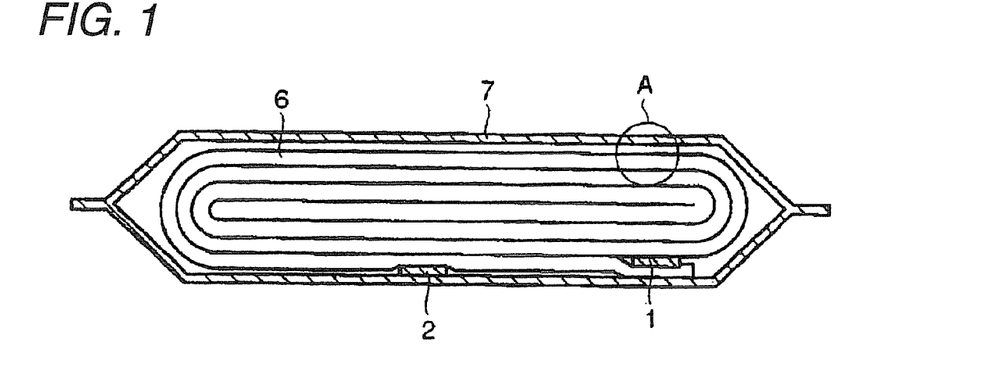
FIG. 1 is a cross-sectional view of an oblate nonaqueous electrolyte secondary battery of a first exemplary embodiment.
Figure 2:
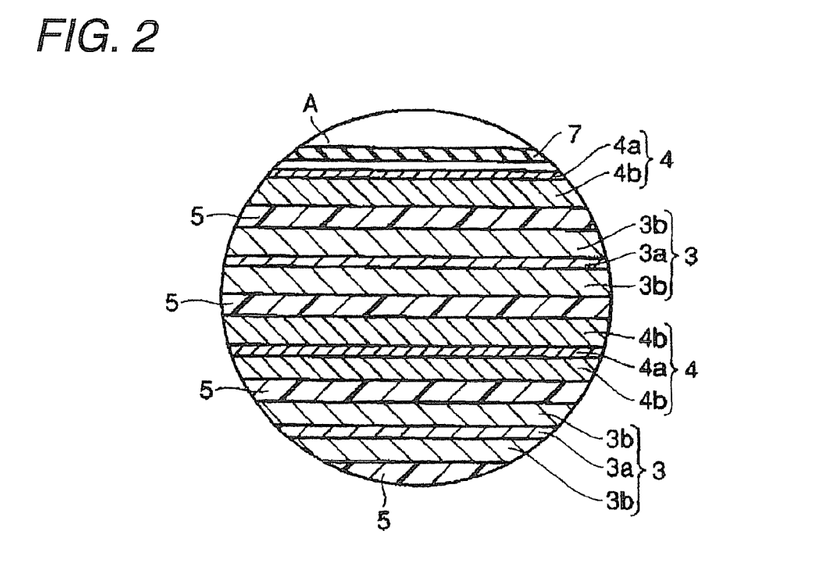
FIG. 2 is a fractional cross-sectional view showing, in a detailed manner, an area enclosed by a circle indicated by A in FIG. 1.

The structure of a battery cell (a nonaqueous electrolyte battery) of a first exemplary embodiment will be described by reference to FIGS. 1 and 2. FIG. 1 shows a cross-sectional view of an oblate nonaqueous electrolytic secondary battery of the first embodiment. FIG. 2 shows a fractional cross-sectional view showing, in a detailed manner, an area enclosed by a circle indicated by A in FIG. 1.

As shown in FIG. 1, an oblate coiled electrode group 6 is housed in an exterior member 7. The coiled electrode group 6 has a structure in which a separator 5 sandwiched between a positive electrode 3 and a negative electrode 4 is helically coiled. A liquid electrolyte is held in the coiled electrode group 6.

As shown in FIG. 2, a negative electrode 4 is situated at the outermost periphery of the coiled electrode group 6. At the inside of this negative electrode 4, a positive electrode 3 and a negative electrode 4 are alternately stacked one on top of the other with a separator 5 sandwiched therebetween, as in sequence of a separator 5, a positive electrode 3, a separator 5, a negative electrode 4, a separator 5, a positive electrode 3, and a separator 5. The negative electrode 4 has a negative electrode collector 4a and a layer 4b containing a negative electrode active material, the layer 4b being supported by the negative electrode collector 4a. At a position on the outermost periphery of the negative electrode 4, the layer 4b is formed on only one side of the negative electrode collector 4a. The positive electrode 3 has a positive electrode collector 3a and a layer 3b containing a positive electrode active material, the layer 3b being supported by the positive electrode collector 3a.

As shown in FIG. 1, a strip-shaped positive electrode terminal 1 is electrically connected to the positive electrode collector 3a located in the vicinity of an outer peripheral edge of the rounded electrode group 6. In the meantime, the strip-shaped negative electrode terminal 2 is electrically connected to the negative electrode collector 4a located at an outer peripheral edge of the rounded electrode group 6. The leading end of the positive electrode terminal 1 and the leading end of the negative electrode terminal 2 are pulled to the outside from the same side of the exterior member 7.

The negative electrode, the nonaqueous electrolyte, the positive electrode, the separator, the exterior material, the positive electrode terminal, and the negative electrode terminal will now be described hereunder.

1) Negative Electrode

The negative electrode has a negative electrode collector and a negative electrode layer. The negative electrode layer is provided on a single surface or both surfaces of the negative electrode collector, and includes a negative electrode active material, a negative electrode conductive agent, and a binder.

The negative electrode active material contains ramsdellite lithium titanate [e.g. $Li_{2+x}Ti_3O_7$ ($0 \leq x \leq 3$) as the principal ingredient, and is characterized by a lithium titanium composite oxide including a small amount of an impurity phase. Specifically, the lithium titanium composite oxide is characterized in that, in the X-ray diffraction, each of the main peak intensity of rutile $TiO_2$, the main peak intensity of anatase $TiO_2$ and the main peak intensity of $Li_2TiO_3$ is 5 or less, on the assumption that the main peak intensity of ramsdellite lithium titanate is 100.

According to the present embodiment, such a lithium titanium composite oxide contains small amounts of impurity phases and, hence, exhibits large effective capacity.

Moreover, in X-ray diffraction, each of the main peak intensity of rutile $TiO_2$, the main peak intensity of anatase $TiO_2$ and the main peak intensity of $Li_2TiO_3$ is preferably 3 or less, on the assumption that the main peak intensity of ramsdellite lithium titanate is 100

In the case of; for example, $Li_2Ti_3O_7$, the main peak of ramsdellite lithium titanate is a peak having a spacing of 0.444 nm (4.44 angstroms) in an X-ray diffraction pattern. The main peak of anatase $TiO_2$ is a peak having a spacing "d" of 0.351 nm (3.51 angstroms); the main peak of rutile $TiO_2$ is a peak having a spacing "d" of 0.325 nm (3.25 angstroms); and the main peak of $Li_2TiO_3$ is a peak having a spacing "d" of 0.207 nm (2.07 angstroms).

The expression of "the main peak intensity is 5 or less" includes the case where any of the main peak intensity of rutile $TiO_2$, the main peak intensity of anatase $TiO_2$, and the main peak intensity of $Li_2TiO_3$ comes to zero and a case where all of the main peak intensities of these substances come to zero. The main peak intensity achieved when the main peak intensity is smaller than a detection limit is assumed to be zero.

Such a lithium titanium composite oxide can exhibit, as secondary effects, enhanced ion conductivity of lithium and, by extension, enhanced large-current characteristics (an output characteristic, an input characteristic, and the like) of the nonaqueous electrolyte battery. This is attributable to the fact that rutile $TiO_2$ and anatase $TiO_2$, which are impurity phases, are of a material exhibiting low ion conductivity. The word "ion conductivity" employed herein signifies a combination of conductivity achieved in a crystallite (a diffusion rate) with conductivity (a diffusion rate) of a crystallite interface.

An example method for manufacturing the lithium titanium composite oxide will now be described.

First, lithium salt, such as lithium hydroxide, lithium oxide, and lithium carbonate, is prepared as a Li source. Next, additional element sources are prepared; specifically, boron oxide is prepared as a B source; sodium hydroxide is prepared as a Na source; phosphorus pentoxide is prepared as a P source; potassium hydroxide is prepared as a K source, and the like. Predetermined amounts of these substances are dissolved into purified water. Exemplary amounts of B, Na, P, and K will be described later. Here, titanium oxide containing an amount of B, Na, P, or K may also be used in place of boron oxide, sodium hydroxide, potassium hydroxide, or phosphorous pentaoxide, and the like, being dissolved into purified water.

Titanium oxide is added into the solution in such a way that an atomic ratio of lithium to titanium comes to a predetermined ratio. For instance, in the case of synthesis of ramsdellite lithium titanium composite oxide having a composition formula $Li_2Ti_3O_7$, titanium oxide is added into the solution in such a way that an atomic ratio of Li to Ti comes to 2:3. When firing is performed at high temperature for long hours, Li escapes. For this reason, Li in excess of a predetermined ratio by an amount of about 5% or less may be added. This amount must be adjusted, as necessary, in conformance with firing conditions.

Next, the acquired solution is dried while being stirred, to thus obtain a fired precursor material. Spray drying, granulation drying, freeze drying, or a combination thereof can be mentioned as a drying method. A resultant fired precursor material is fired, to thus produce a lithium titanium composite oxide. It is better to perform the firing in an atmosphere, but the firing may also be performed in an oxygen atmosphere or an argon atmosphere.

It is better to perform the firing within a temperature range from 900° C. to 1300° C. and within a range of time from one hour to 24 hours. A preferable temperature range is 940° C. to 1100° C., and a preferable range of time is one hour to 10 hours.

When the temperature is less than 900° C., a reaction of a titanium oxide with a lithium compound becomes insufficient, and the amounts of impurity phases, such as anatase $TiO_2$, rutile $TiO_2$, and $Li_2TiO_3$, are increased, whereby electric capacity is diminished. When the temperature has surpassed 1300° C., a portion of the ramsdellite phase is likely to become phase-separated into spinel lithium titanate ($Li_4Ti_5O_{12}$) and rutile lithium titanate $TiO_2$ (r-$TiO_2$), whereupon an increase in the amounts of the impurity phases and a decrease in electric capacity take place.

In the lithium titanium composite oxide manufactured by the above manufacturing method, the additional element (B, Na, P, or K) prevents occurrence of phase separation of the crystallite of ramsdellite lithium titanate. Consequently, a lithium titanium composite oxide containing ramsdellite lithium titanate as the principal ingredient and small amounts of impurity phases can be obtained.

In more detail, the additional element (B, Na, P, or K) is considered to first incorporate into a Li site of ramsdellite lithium titanate. Subsequently, the additional element over a limit of the solid solution becomes segregated on the interface of the crystallite of ramsdellite lithium titanate. The additional element segregated on the interface of the crystallite is considered to induce the previously-described effects of preventing phase separation and effect control on the growth of the crystallite. The manner of segregation of the additional element on the interface of the crystallite; namely, the manner of the additional element being distributed over the interface of the crystallite at high density, can be ascertained by use of a transmission electron microscope, or the like.

The amount of the additional element (B, Na, P, or K) achieved at this time preferably ranges from 0.01 to 5 wt % with respect to the lithium titanium composite oxide. When the amount of the additional element is 0.01 wt % or more, the amount of an element segregated on the interface of the crystallite increases, which renders the phase separation prevention effect noticeable. In contrast, when the amount of the additional element is 5 wt % or less, the chance of B, Na, P, or K forming an oxide and the oxide decreasing, as an impurity phase, electric capacity is small. The amount is more preferably 0.1 wt % to 3 wt %.

A portion of the additional element, such as B, Na, P, or K, incorporates into the Li site of the ramsdellite lithium titanate. In other words, the Li site of the ramsdellite lithium titanate has both Li and the additional element. This can be ascertained by subjecting the acquired lithium titanium composite oxide to X-ray diffraction measurement and Reitveld analysis. Analysis software "RIETAN (Tradename)" is used for Reitveld analysis.

Among additional elements, P or B is preferable. These elements are likely to become segregated on the interface of the crystallite, and a great effect can be yielded at small loads.

Moreover, from the viewpoint of enhancement of the large-current characteristic, P is still more preferable additional element, because it exhibits the highest effect of suppressing grain growth.

B, Na, P, or K segregated on the interface of the crystallite can prevent structural collapse of the ramsdellite phase, which would otherwise arise during charge and recharge operation, and a cycle characteristic of the nonaqueous electrolyte battery can be enhanced. In normal times, volume expansion or contraction incident to charge and recharge operation consequently induces structural deterioration (so-called pulverization) of the ramsdellite phase. However, the volume expansion or contraction can be lessened as a result of high-concentration distribution of the additional element over the interface of the crystallite.

Moreover, in the case of the lithium titanium composite oxide of the present embodiment, the diameter of the crystallite can be reduced while the amounts of impurity phases in the crystallite are kept small. In the related art, in the case of a lithium titanium composite oxide having a ramsdellite structure which is a phase stable at high temperature, difficulty has been encountered in producing a power having a small crystallite diameter while keeping the amounts of impurity phases low. The reason for this is that, when an attempt is made to reduce a firing temperature or shorten a firing time with a view toward suppressing growth of a crystallite, anatase $TiO_2$ (a-$TiO_2$), rutile $TiO_2$ (r-$TiO_2$), $Li_2TiO_3$, and the like, is generated or remains as an unreacted substance. However, according to the previously-described method, even when firing is performed at high temperature so as to prevent occurrence of an unreacted substance, thereby enabling acquisition of a lithium titanium composite oxide containing, as the principal ingredient, ramsdellite lithium titanate whose crystallite size is small.

The crystallite size of the lithium titanium composite oxide determined by application of the Scherrer's equation to the half value width of the X-ray diffraction peak is preferably 80.1 nm (801 angstroms) or less. Ion conductivity is enhanced to a much greater extent by reducing the crystallite diameter so as to become smaller than that value. The phenomenon is considered to be attributable to the fact that the diffusion speed of lithium ions achieved at the interface of the crystallite is faster than that achieved in the crystallite. A more preferable crystallite diameter is 70.0 nm (700 angstroms) or less; more preferably 50.1 nm (501 angstroms) or less.

The crystallite diameter of the lithium titanium composite oxide is preferably 10.0 nm (100 angstroms) or more. Since the crystallite diameter is 10.0 nm or more, generation of the lithium titanium composite oxide including small amounts of impurity phases, such as rutile $TiO_2$, anatase $TiO_2$, $Li_2TiO_3$, and the like, is facilitated. A more preferable crystallite size is 20.0 nm (200 angstroms or more), and more preferably 41.0 nm (410 angstroms) or more.

The particle size of the lithium titanium composite oxide preferably ranges from 100 nm to 1 μm. When the particle size is 100 nm or greater, handling of the lithium titanium composite oxide becomes easy from the viewpoint of industrial production. When the particle size is 1 μm or less, diffusion of lithium ions within a solid can be caused to advance smoothly. The term "particle size" used herein means an average particle size of powder particles and can be ascertained by a laser diffraction distribution measuring apparatus, a scanning electron microscope, and the like.

A specific surface area of the lithium titanium composite oxide preferably ranges from 5 to 50 $m^2/g$. When the specific surface area is 5 $m^2/g$ or more, a site for absorbing and releasing lithium ions can be ensured sufficiently. When the specific surface area is 50 $m^2/g$ or less, the lithium titanium composite oxide becomes easy to handle from the viewpoint of industrial production.

In the case of the lithium titanium composite oxide, even when an element, such as Nb, Pb, Fe, Ni, Si, Al, Zr, and the like, is caused to incorporate into a Ti site, similar effects are yielded. The additional element B, Na, P, or K chiefly occupies the interface of the crystallite or the Li site and does not occupy the Ti site.

The lithium titanium composite oxide of the present embodiment may also contain spinel lithium titanate. In this case, an enhanced cycle characteristic can be attained.

In X-ray diffraction, each of the main peak intensity of rutile $TiO_2$, the main peak intensity of anatase $TiO_2$, and the main peak intensity of $Li_2TiO_3$ is 5 or less, on the assumption that a total of the main peak intensity of ramsdellite lithium titanate and the main peak intensity of spinel lithium titanate is 100.

Such lithium titanium composite oxides can be formed by mixing the previously-described lithium titanium composite oxide that contains ramsdellite lithium titanate as the principal ingredient and small amounts of impurities with a lithium titanium composite oxide that contains spinel lithium titanate as the principal ingredient and small amounts of impurities (the invention of the composite oxide has already filed by the present inventors, and please make a reference to JP-A-2006-318797).

When consideration is given to a balance between an output characteristic and a cycle characteristic, the ratio of the main peak intensity of ramsdellite lithium titanate to the main peak intensity of spinel lithium titanate in X-ray diffraction preferably falls within a range from 1:9 to 5:5. Since the lithium titanium composite oxide of the present embodiment contains low amounts of impurities and is of highly crystalline, the mass percent of the lithium titanium composite oxide can be estimated from a main peak intensity ratio determined through XRD (X-ray diffraction) measurement.

The crystallite diameter of the lithium titanium composite oxide containing spinel lithium titanate as the principal ingredient is preferably 69.0 nm (690 angstroms) or less. More preferably, the diameter is 53.0 nm (530 angstroms) or less; further more preferably 44.0 nm (440 angstroms) or less.

The particle size of the lithium titanium composite oxide containing spinel lithium titanate as the principal ingredient preferably ranges from 100 nm to 1 μm.

For instance, acetylene black, carbon black, graphite, and the like, can be mentioned as a negative electrode conductive material used for enhancing current collecting performance and reducing contact resistance against the collector.

For instance, a binder for binding the negative electrode active material with the negative electrode conductive material includes; for example, polytetrafluoroethylene (PTFE), polyvinylidene difluoride (PVdF), fluorine-based rubber, styrene butadiene rubber, and the like.

In relation to a compounding ratio of a negative electrode active material, a negative electrode conductive agent, and a binder, the negative electrode active material is preferably set so as to fall within a range from 70 to 96 wt %; the negative electrode conductive agent is preferably set so as to fall within a range from 2 to 28 wt %; and a binder is preferably set so as to fall within a range from 2 to 28 wt %. When the amount of negative electrode conductive agent is less than 2 wt %, the current collection performance of the negative electrode layer is deteriorated, and the large-current characteristic of the nonaqueous electrolytic secondary battery is also deteriorated. Further, when the amount of binder is less than 2 wt %, integrity between the negative electrode layer and the negative electrode collector is deteriorated, and the cycle characteristic is deteriorated. In the meantime, from the viewpoint of an increase in capacity, the negative electrode conductive agent and the binder are preferably 28 wt % or less, respectively.

The negative electrode collector is preferably an aluminum foil which is electrochemically stable within a potential range which is noble with compared with 1.0 V or an aluminum alloy foil containing an element, such as Mg, Ti, Zn, Mn, Fe, Cu, and Si.

The negative electrode is formed by applying, to the negative electrode collector, a slurry that is formed by bringing a negative electrode active material, a negative electrode conductive agent, and a binder into suspension in a general-purpose solvent; drying the slurry, to thus prepare a negative electrode layer; and pressing the negative electrode layer. In addition, the negative electrode active material, the negative electrode conductive agent, and the binder may also be made into the form of a pellet, and the thus-created pellet may also be used as a negative electrode layer.

2) Nonaqueous Electrolyte

A liquid nonaqueous electrolyte adjusted by dissolving an electrolyte into an organic solvent, a gel nonaqueous electrolyte formed by combining a liquid electrolyte with a macromolecular material, and the like, can be mentioned as the nonaqueous electrolyte.

The liquid nonaqueous electrolyte is prepared by dissolving an electrolyte into an organic solvent at a concentration from 0.5 to 2.5 mol/l.

Lithium salt; for example, lithium perchlorate ($LiClO_4$), lithium hexafluorophosphate ($LiPF_6$), lithium tetrafluoroborate ($LiBF_4$), lithium hexafluoroarsenate ($LiAsF_6$), trifluoro meta lithium sulfonate ($LiCF_3SO_3$), bis-trifluoromethylsulfonyl imide lithium [$LiN(CF_3SO_2)_2$], and the like, or mixtures thereof can be mentioned as the electrolyte. A substance which is less susceptible to oxidation even at a high voltage is preferable, and $LiPF_6$ is most preferable.

For instance, a single solvent of: ring-shaped carbonate, such as propylene carbonate (PC), ethylene carbonate (EC), and vinylene carbonate; chain carbonate, such as diethyl carbonate (DEC), dimethyl carbonate (DMC), and methylethyl carbonate (MEC); ring-shaped ether, such as tetrahydrofuran (THF), 2-methyl tetrahydrofuran (2MeTHF), and dioxolane (DOX); chain ether, such as dimethoxy ethane (DME) and dietho-ethane (DEF); γ-butyrolactone (GBL), acetonitrile (AN), sulfolane (SL), and the like; or a mixed solvent thereof, can be mentioned as an organic solvent.

For instance, polyvinylidene difluoride (PVdF), polyacrylonitrile (PAN), polyethylene oxide (PEO), and the like, can be mentioned as a macromolecular material.

A mixed solvent containing a mixture of two or more solvents selected from the group consisting of propylene carbonate (PC), ethylene carbonate (EC), and γ-butyrolactone (GBL) is mentioned as a preferable organic solvent. A solvent γ-butyrolactone (GBL) is mentioned as a more preferable organic solvent. The reason for this is as follows.

The lithium titanium composite oxide performs absorption-release of lithium ions at a potential range in the vicinity of 1.5 V (vs. Li/Li$^+$). However, reductional decomposition of a nonaqueous electrolyte is difficult to arise in this potential range, and a coating—which is a reduced product of a nonaqueous electrolyte—is less likely to be formed on the surface of the lithium titanium composite oxide. For these reasons, when the lithium titanium composite oxide is preserved in a lithium-absorbed state; namely, a recharged state, the lithium ions absorbed by the lithium titanium composite oxide gradually diffuse into the electrolyte, whereupon so-called self-discharge is induced. Self-discharge noticeably takes place when an environment where the battery is stored becomes hot.

As mentioned above, the lithium titanium composite oxide of the present embodiment has a small crystallite diameter, and hence a per-unit crystal grain-boundary area becomes great. For this reason, the amount of self-discharge of the titanium lithium composite oxide becomes somewhat greater than does that induced by a related-art material.

A solvent γ-butyrolactone is more vulnerable to reduction when compared with the chain carbonate or the ring-shaped carbonate used in a related-art nonaqueous electrolyte battery. Specifically, substances are more vulnerable to reduction in ascending sequence of γ-butyrolactone>>>ethylene carbonate>propylene carbonate>>dimethyl carbonate>methyl ethyl carbonate>diethyl carbonate.

Therefore, when γ-butyrolactone is dissolved into an electrolyte, a superior coating can be formed over the surface of the lithium titanium composite oxide even in an operating voltage range of the lithium titanium composite oxide. Consequently, occurrence of self-discharge is prevented, and a high-temperature storage characteristic of the nonaqueous electrolyte battery can be enhanced.

The same also can be said to be applied to the previously-described mixed solvent.

With a view toward forming a protective coating of better quality, the γ-butyrolactone content in the organic solvent should preferably be set to 40 to 90 volume %.

3) Positive Electrode

The positive electrode has a positive electrode collector and a positive electrode layer. The positive electrode layer is provided a single surface or both surfaces of the positive electrode collector, and includes a positive electrode active material, a positive electrode conductive agent, and a binder.

Oxides, polymers, and the like, are mentioned as the positive electrode active material.

For instance, Li-absorbing manganese dioxide ($MnO_2$), iron oxide, copper oxide, nickel oxide, a lithium manganese composite oxide (e.g., $Li_xMn_2O_4$ or $LixMnO_2$), a lithium nickel composite oxide (e.g., $Li_xNiO_2$), a lithium cobalt composite oxide ($LixCoO_2$), a lithium nickel cobalt composite oxide (e.g., $LiNi_{1-y}CoyO_2$), a lithium manganese cobalt composite oxide ($LiMn_yNiCo_{1-y}O_2$), a spinel lithium manganese nickel composite oxide ($LixMn_{2-y}NiyO_4$), a lithium phosphorous oxide having an olivin structure ($LixFePO_4$, $LixFe_{1-y}Mn_yPO_4$, $Li_xCoPO_4$, and the like), iron sulfate [$Fe_2(SO_4)_3$], vanadium oxides (e.g., $V_2O_5$), and the like, can be mentioned as oxides.

For instance, a conductive polymer material, such as polyaniline and polypyrole, and a disulfide-based polymer material, and the like, are mentioned as polymer. In addition, sulfur (S), fluorocarbon, and the like, can also be used.

A preferred positive electrode active material includes a lithium manganese composite oxide (e.g., $Li_xMn_2O_4$), a lithium nickel composite oxide (e.g., $Li_xNiO_2$), a lithium cobalt composite oxide ($LixCoO_2$), a lithium nickel cobalt composite oxide (e.g., $LiNi_{1-y}CoyO_2$), a spinel lithium manganese nickel composite oxide ($LixMn_{2-y}NiyO_4$), a lithium manganese cobalt composite oxide ($LiMn_yNiCo_{1-y}O_2$), lithium iron phosphate ($Li_xFePO_4$), and the like, ("x" and "y" preferably fall within a range from 0 to 1).

More preferable positive electrode active materials include a lithium cobalt composite oxide or a lithium manganese composite oxide. Since these substances exhibit high ion conductivity, diffusion of lithium ions in the positive electrode active material becomes difficult to reach a rate determining step when the positive electrode active material is combined with the negative electrode active material of the present embodiment. For this reason, these substances are superior in compatibility with the lithium titanium composite oxide of the present embodiment.

The primary particle size of the positive electrode active material preferably ranges from 100 nm to 1 μm. When the particle size is 100 nm or more, the positive electrode active material is easy to handle from the viewpoint of industrial production. When the particle size is 1 μm, diffusion of lithium ions in a solid can be caused to advance smoothly.

A specific surface area of the positive electrode active material preferably ranges from 0.1 to 10 m$^2$/g. When the specific surface area is 0.1 m$^2$/g or more, a site for absorbing and desorbing lithium ions can be ensured sufficiently. When the specific surface area is 10 m$^2$/g or less, the positive electrode active material becomes easy to handle from the viewpoint of industrial production, and superior charge-recharge cycle performance can be ensured.

For instance, carbonaceous substances, such as acetylene black, carbon black, and graphite can be mentioned as the positive electrode conductive agent for enhancing current collection performance and occurrence of contact against the collector.

For instance, a binder for binding the positive electrode active material with the positive electrode conductive material includes; for example, polytetrafluoroethylene (PTFE), polyvinylidene difluoride (PVdF), fluorine-based rubber, styrene butadiene rubber, and the like.

In relation to a compounding ratio of a positive electrode active material, a positive electrode conductive agent, and a binder, the positive electrode active material is preferably set so as to fall within a range from 80 to 95 wt %; the positive electrode conductive agent is preferably set so as to fall within a range from 3 to 18 wt %; and a binder is preferably set so as to fall within a range from 2 to 17 wt %. When the amount of positive electrode conductive agent is 3 wt % or more, the foregoing effects can be yielded. When the amount of positive electrode conductive agent is 18 wt % or less, decomposition of a nonaqueous electrolyte on the surface of the positive electrode conductive agent in a high-temperature preserved state can be lessened. When the amount of binder is 2 wt % or more, sufficient electrode intensity is achieved. In contrast, when the amount of binder is 17 wt % or less, a reduction in the amount of insulator contained in the electrode and a reduction in internal resistance can be reduced.

The positive electrode collector is preferably formed from an aluminum foil or an aluminum alloy foil containing an element, such as Mg, Ti, Zn, Mn, Fe, Cu, and Si.

The positive electrode is formed by applying, to the positive electrode collector, a slurry that is formed by bringing a positive electrode active material, a positive electrode conductive agent, and a binder into suspension in an appropriate solvent; drying the slurry, to thus prepare a positive electrode layer; and pressing the positive electrode layer. In addition, the positive electrode active material, the positive electrode conductive agent, and the binder may also be made into the form of a pellet, and the thus-created pellet may also be used as a positive electrode layer.

4) Separator

For instance, a porous film containing polyethylene, polypropylene, cellulose, or polyvinylidene difluoride (PVdF), a nonwoven fabric made of synthetic resin, and the like, can be mentioned as a separator. Of these films, a porous film formed from polyethylene or polypropylene becomes fused at a given temperature, thereby enabling breakage of an electric current. From the viewpoint of enhanced safety, the film is preferable.

5) Exterior Material

A laminate film having a thickness of 0.2 mm or less or a metallic container having a thickness of 0.5 mm or less is mentioned as an exterior material. The thickness of the metallic container is preferably 0.2 mm or less.

An oblate shape, an angular shape, a cylindrical shape, a coin shape, a button shape, a sheet shape, a stacked shape, and the like, can be mentioned as the shape of the exterior material. As a matter of course, in addition to a compact battery disposed in a portable electronic device, and the like, a large battery disposed in a two-wheeled or four-wheeled automobile, and the like, may also be acceptable.

The laminate film is a multilayer film formed from a metallic layer and a resin layer for covering the metallic layer. From the viewpoint of a weight reduction, the metallic layer is preferably an aluminum foil or an aluminum alloy foil. The resin layer is for reinforcing the metallic layer. A high polymer, such as polypropylene (PP), polyethylene (PE), nylon, and polyethylene terephthalate (PET) can be used for the resin layer. The laminate film can be sealed by heat sealing.

Aluminum, an aluminum alloy, and the like, can be mentioned as the metallic container. An alloy containing an element, such as magnesium, zinc, and silicon, is preferable as an aluminum alloy. In the meantime, transition metal, such as iron, copper, nickel, and chromium, is preferably set to an amount of 100 ppm or less.

6) Negative Electrode Terminal

A material—which exhibits electrical stability and conductivity within a range where an electric potential with respect to lithium ion metal ranges from 1.0 V to 3.0 V—is used for the negative electrode terminal. Specifically, aluminum or an aluminum alloy containing an element, such as Mg, Ti, Zn, Mn, Fe, Cu, and Si, is mentioned. In order to reduce contact resistance, a material analogous to that of the negative electrode collector is preferable.

7) Positive Electrode Terminal

A material—which exhibits electrical stability and conductivity within a range where an electric potential with respect to lithium ion metal ranges from 3.0V to 4.25V—is used for the negative electrode terminal. Specifically, aluminum or an aluminum alloy containing an element, such as Mg, Ti, Zn, Mn, Fe, Cu, and Si, is mentioned. In order to reduce contact resistance, a material analogous to that of the positive electrode collector is preferable.

Figure 3:
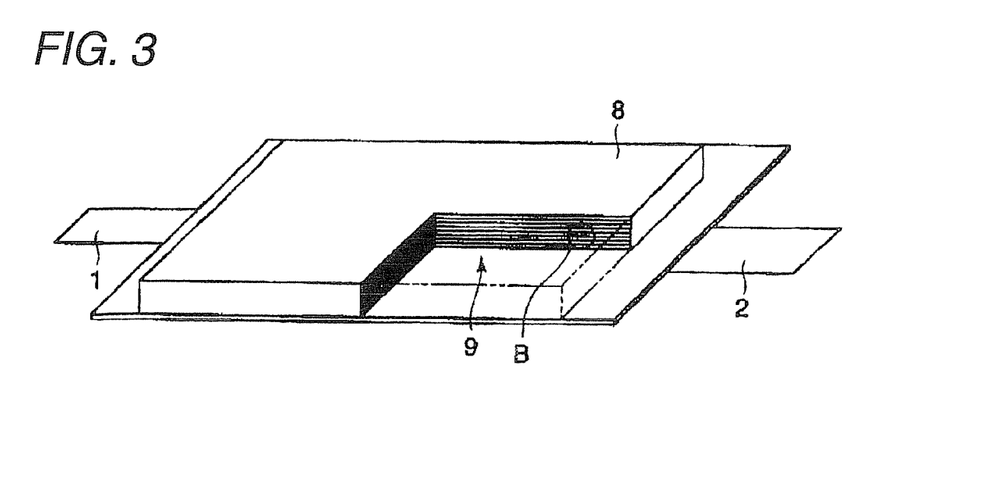
FIG. 3 is a partially-cutout perspective view diagrammatically showing another oblate nonaqueous electrolytic secondary battery of the first embodiment.
Figure 4:
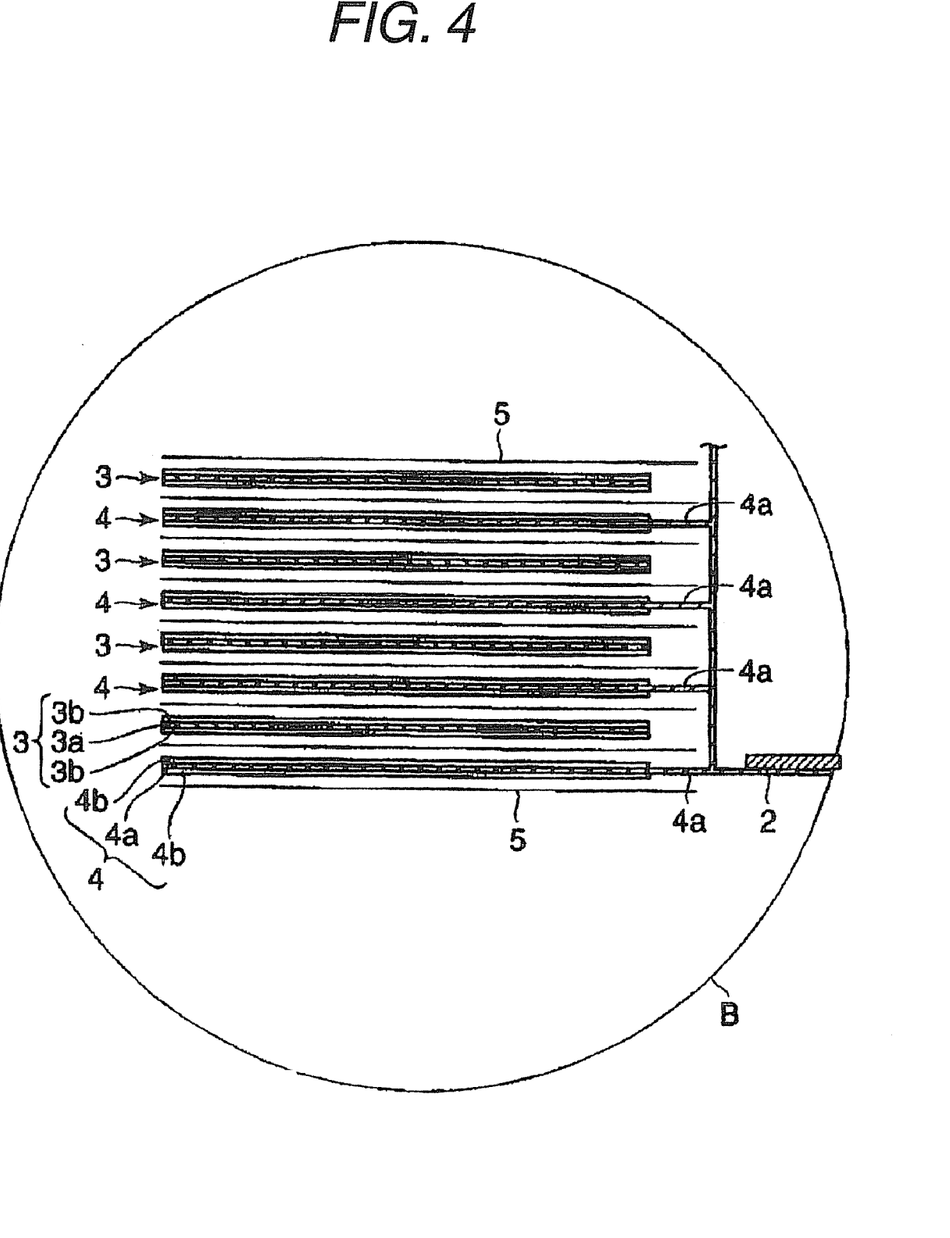
FIG. 4 is an enlarged cross-sectional view of section B shown in FIG. 3.

The nonaqueous electrolyte battery of the first embodiment is not limited to the battery of the previously-described configuration shown in FIGS. 1 and 2. For instance, the nonaqueous electrolyte battery can be configured as show in; e.g., FIGS. 3 and 4. FIG. 3 is a partially-cutout perspective view diagrammatically showing another oblate nonaqueous electrolytic secondary battery of the first embodiment, and FIG. 4 is an enlarged cross-sectional view of section B shown in FIG. 3.

As shown in FIG. 3, a stacked electrode group 9 is housed in an exterior member 8 formed from a laminate film. As shown in FIG. 4, the stacked electrode group 9 has a structure in which the positive electrodes 3 and the negative electrodes 4 are stacked one after another with the separator 5 sandwiched therebetween. The positive electrode 3 is provided in numbers, and each of the positive electrodes 3 has a positive electrode collector 3a and a layer 3b containing a positive electrode active material, laid over respective surfaces of the positive electrode collector 3a. The negative electrode 4 is provided in numbers, and each of the negative electrodes has a negative electrode collector 4a and a layer 4b containing a negative electrode active material, laid over both surfaces of the negative electrode collector 4a. One side of the negative electrode collector 4a of each negative electrode 4 projects from the positive electrode 3. The negative electrode collectors 4a projecting from the positive electrodes 3 are electrically connected to the strip-shaped negative electrode terminal 2. The leading end of the strip-shaped negative electrode terminal 2 is pulled to the outside from the exterior member 8. Although unillustrated, sides of the positive electrode collectors 3a of the positive electrodes 3 located opposite the projecting sides of the negative electrode collectors 4a project out of the negative electrodes 4. The positive electrode collectors 3a projecting from the negative electrodes 4 are electrically connected to the strip-shaped positive electrode terminal 1. The leading end of the strip-shaped positive electrode terminal 1 is situated opposite the negative electrode terminal 2 and pulled to the outside from the side of the exterior member 8.

Second Embodiment

A battery pack of the second embodiment has the plurality of battery cells of the first embodiment, and the respective battery cells are arranged in an electrically series or parallel layout, thereby constituting a battery pack.

The battery cell of the first embodiment is suitable for realization of a battery pack, and the battery pack of the second embodiment exhibits a superior cycle characteristic. Explanations will now be described to this point.

When the crystallite size of the lithium titanium composite oxide becomes smaller, a phase where a crystalline structure becomes irregular increases. As a result, the charge-discharge end of negative electrode potential and, by extension, the charge-discharge end of the battery voltage, becomes gradual. Consequently, for instance, variations in battery voltage in a series-connected battery pack, which would otherwise arise during full recharge for reasons of individual differences of battery capacity, can be reduced. Therefore, the battery pack of the second embodiment exhibits superior controllability of the battery pack and enables enhancement of the cycle characteristic.

The oblate battery shown in FIG. 1 or 3 can be used for the battery pack.

Figure 5:
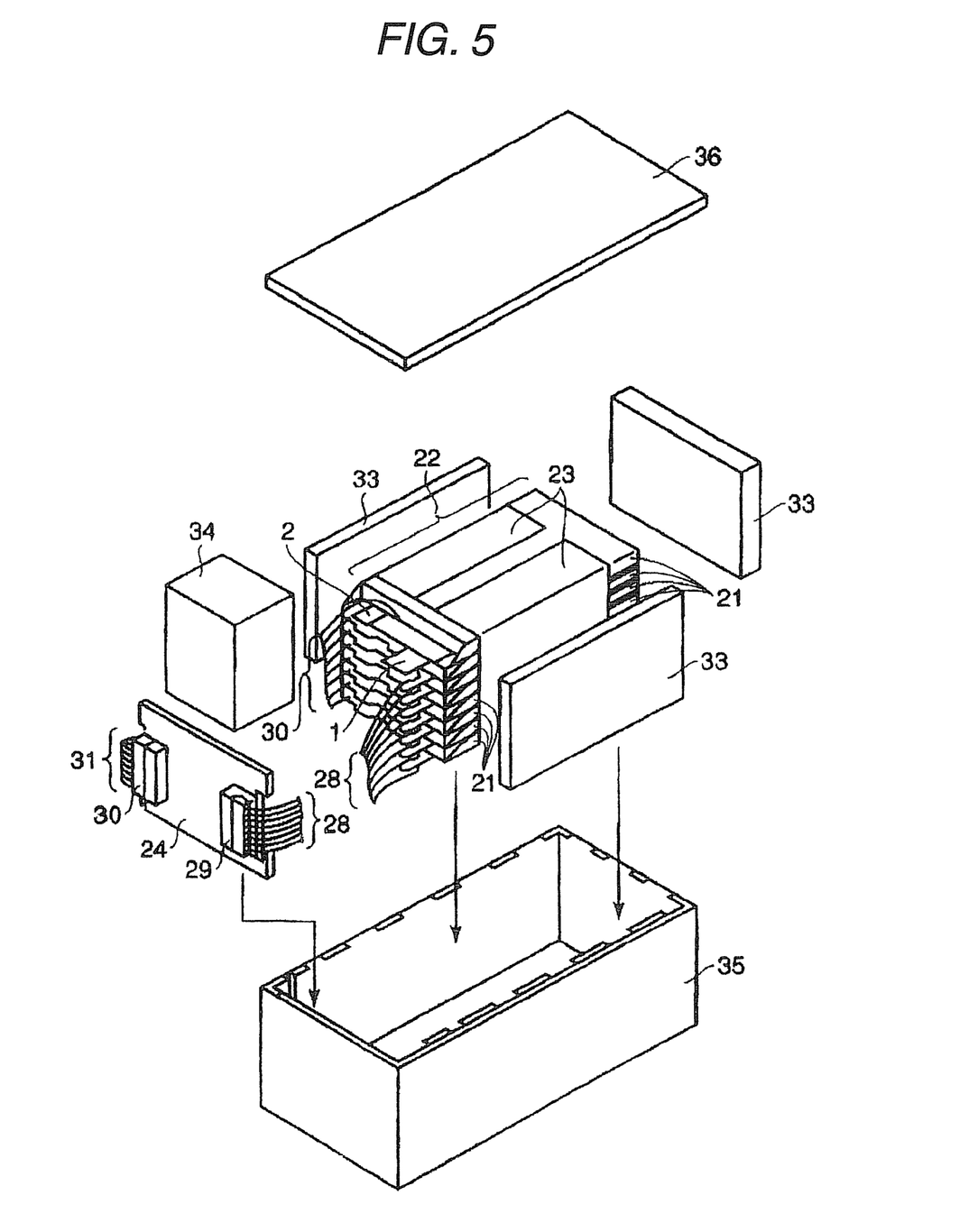
FIG. 5 is an exploded perspective view of a battery pack of a second exemplary embodiment.
Figure 6:
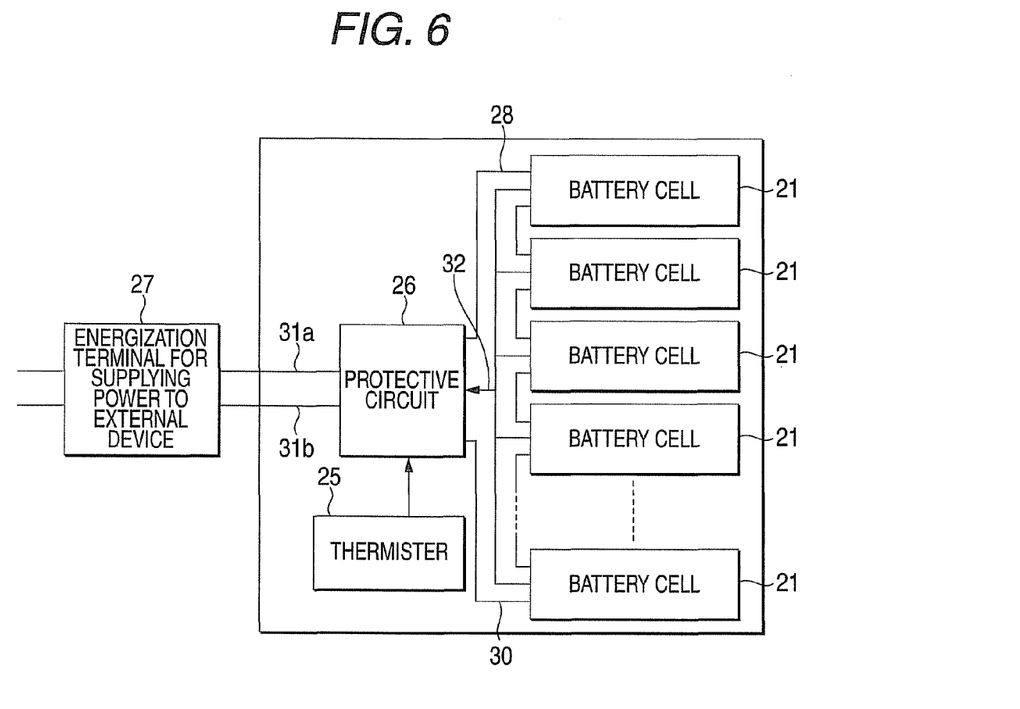
FIG. 6 is a block diagram showing an electrical circuit of the battery pack shown in FIG. 5.

The battery cells 21 in the battery pack shown in FIG. 5 are formed from the oblate nonaqueous electrolyte battery shown in FIG. 1. The plurality of battery cells 21 are stacked in a thicknesswise direction while the projections of the positive electrode terminals 1 and the projections of the negative electrode terminals 2 are aligned to a single direction. As shown in FIG. 6, the battery cells 21 are connected in series, to thus form the battery pack 22. As shown in FIG. 5, the battery pack 22 is integrated into a single unit.

A printed wiring board 24 is positioned along a side of the battery pack where the projections of the positive electrode terminals 1 and the projections of the negative electrode terminals 2 are provided. As shown in FIG. 6, a thermistor 25, a protective circuit 26, and an energization terminal 27 for use in providing energy to external devices are implemented on the printed wiring board 24.

As shown in FIGS. 5 and 6, a positive electrode wiring 28 of the battery pack 22 is electrically connected to a positive electrode connector 29 of the protective circuit 26 of the printed wiring board 24. A negative electrode wiring 30 of the battery pack 22 is electrically connected to a negative electrode connector 31 of the protective circuit 26 of the printed wiring board 24.

The thermistor 25 is for detecting the temperature of the battery cell 21, and a detection signal is transmitted to the protective circuit 26. The protective circuit 26 can shut off a plus wiring 31a and a minus wiring 31b provided between the protective circuit and the energization terminal for external devices, under predetermined conditions. The predetermined conditions include detection of a temperature detected by the thermistor having reached a predetermined temperature or more, detection of the excessive recharge or discharge of the battery cell 21, and the like. This detection method is applied to the respective battery cells 21 or the entirety of the battery cells 21. When each of the battery cells 21 is detected, detection of a battery voltage or detection of the positive electrode voltage or the negative electrode voltage may also be performed. In the latter case, a lithium electrode used as a reference electrode is inserted into each of the battery cells 21. In the case shown in FIG. 6, wires 32 for use in detecting a voltage are connected to the respective battery cells 21, and a detection signal is transmitted to the protective circuit 26 by way of these wires 32.

Three side surfaces of this battery pack 22 exclusive of the side from which the positive electrode terminals 1 and the negative electrode terminals 2 project are provided with respective protective sheets 33 formed from rubber or a resin. The protective block 34 formed from rubber or resin is interposed between the side surface from which the positive electrode terminals 1 and the negative electrode terminals 2 project and the printed wiring board 24.

This batter pack 22 is housed in a storage container 35 along with the respective protective sheets 33, the protective block 34, and the printed wiring board 24. The protective sheets 33 are disposed along longitudinal inner surfaces and lateral inner surfaces of the storage container 35. The battery pack 22 is placed in a space enclosed by the protective sheets 33 and the printed wiring board 24. A cover 36 is attached to an upper surface of the storage container 35.

A heat-shrinkable tape may also be used in place of the adhesive tape 23 for fixing the battery pack 22. In this case, a protective sheet is provided on both side surfaces of the battery pack, and a heat-shrinkable tube is passed around the battery pack. Thereafter, the heat-shrinkable tube is subjected to thermal shrinkage, to thus bundle the battery pack.

Although the battery cells 21 shown in FIGS. 5 and 6 are connected in series, they may also be connected in parallel in order to increase battery capacity. As a matter of course, bundled battery packs can also be connected in series or parallel.

The form of the battery pack is changed, as necessary, according to its application.

An application where greater capacity and, by extension, a heavy-current characteristic are expected is preferable for the battery pack of the second embodiment. Specifically, The battery pack of the second embodiment will be provided in a digital camera which is expected to effect an electric discharge of about 3 C, a two-wheeled or four-wheeled hybrid automobile, a two-wheeled or four-wheeled electric vehicle, an assisted bicycle, and the like, which are expected to effect an electric discharge of about 10 C or more.

When the battery pack includes, as a nonaqueous electrolyte, a mixed solvent—which is formed by mixing at least two types of substances selected from the group consisting of propylene carbonate (PC), ethylene carbonate (EC), and γ-butyrolactone (GBL)—or γ-butyrolactone (GBL), an application where a high-temperature characteristic is expected is desirable. Specifically, in this case, the battery pack of the second embodiment is preferably disposed in the previously-described automobile.

EXAMPLES

Although examples are provided below, the present invention is not limited to these examples unless otherwise the gist of the present invention is changed.

<Capacity Characteristic and Large-current Characteristic>

Example 1

<Manufacture of the Positive Electrode>

First, 90 wt % of a lithium cobalt oxide ($LiCoO_2$) serving as a positive electrode active material and 5 wt % of acetylene black and 5 wt % of polyvinylidene difluoride (PVdF), both of which serve as conductive agents, were mixed with N-methylpyrrolidinone (NMP), to thus prepare a slurry. This slurry was applied over both surfaces of the collector made from an aluminum foil having a thickness of 15 μm; and the slurry was subjected to drying and pressing, whereupon the positive electrode having electrode density of 3.3 g/cm$^3$ was produced.

<Manufacture of Lithium Titanium Composite Oxide>

First, anatase titanium oxide was charged into a liquid solution formed by dissolving potassium hydrate into purified water, and a resultant product material was dried and fired at 1,000° C. for five hours in the atmosphere. A ramsdellite lithium titanium composite oxide ($Li_2Ti_3O_7$) containing 0.011 wt % of K was obtained.

In X-ray diffraction, when the main peak intensity of the ramsdellite lithium titanate was taken as 100, the main peak intensity of rutile $TiO_2$ was 3, and the main peak intensity of anatase $TiO_2$ and the main peak intensity of $Li_2TiO_3$ were less than 1. The crystallite size of lithium titanium composite oxide achieved at this time was 675 angstroms. Further, an average particle size of a lithium titanium composite oxide powder was 0.82 μm.

<Measurement of Intensity Ratio of the Main Peaks and a Crystallite Diameter

Figure 7:
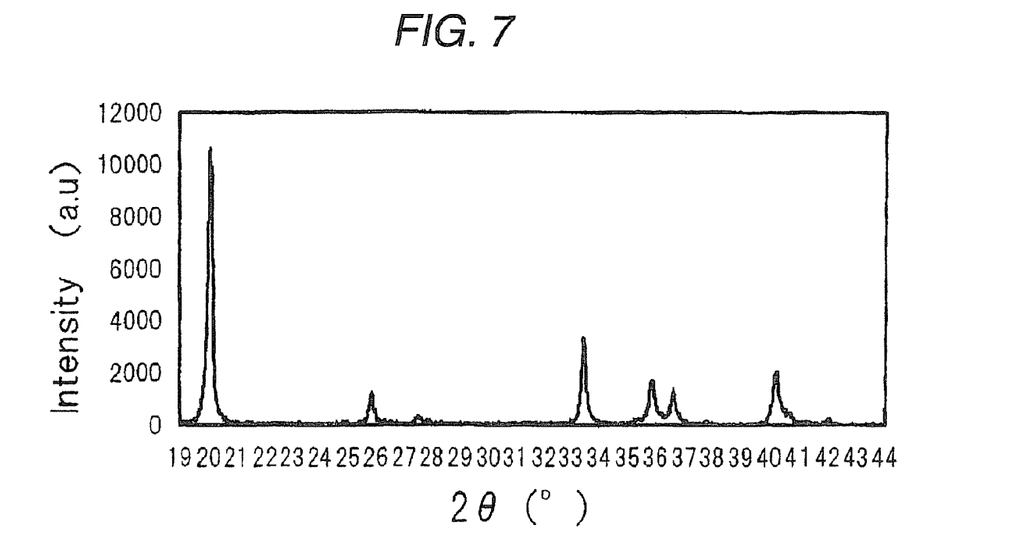
FIG. 7 is an X-ray diffraction pattern of a lithium titanium composite oxide of the first embodiment.

An X-ray diffraction pattern of the lithium titanium composite oxide using Cu—Kα thereof was first determined through use of an XRD (Model No. M18XHF[22]-SRA manufactured by Mac Science Corporation). FIG. 7 shows an example X-ray diffraction pattern of the lithium titanium composite of the first embodiment. X-ray diffraction patterns having undergone removal of a background and removal of a Kα2 line were used for subsequent analysis operations. Assignments of the respective peaks shown in FIG. 7 are as follows.

| | | |
|---|---|---|
| Li$_2$Ti$_3$O$_7$: | (h, k, l) = (1, 1, 0) | 2 theta = 19.9820 (d = 4.4399) |
| Li$_2$Ti$_3$O$_7$: | (h, k, l) = (1, 2, 0) | 2 theta = 25.7210 (d = 3.4608) |
| Li$_2$Ti$_3$O$_7$: | (h, k, l) = (1, 3, 0) | 2 theta = 33.3030 (d = 2.6882) |
| Li$_2$Ti$_3$O$_7$: | (h, k, l) = (1, 0, 1) | 2 theta = 35.2910 (d = 2.5412) |
| Li$_2$Ti$_3$O$_7$: | (h, k, l) = (1, 1, 1) | 2 theta = 36.5429 (d = 2.5469) |
| Li$_2$Ti$_3$O$_7$: | (h, k, l) = (0, 4, 0) | 2 theta = 37.6369 (d = 2.3880) |
| Li$_2$Ti$_3$O$_7$: | (h, k, l) = (1, 2, 1) | 2 theta = 40.1790 (d = 2.2426) |
| Li$_2$Ti$_3$O$_7$: | (h, k, l) = (2, 2, 0) | 2 theta = 40.5690 (d = 2.2219) |
| Li$_2$Ti$_3$O$_7$: | (h, k, l) = (1, 4, 0) | 2 theta = 41.8610 (d = 2.1563) |
| Li$_2$TiO$_3$: | (h, k, l) = (2, 0, 0) | 2 theta = 43.6906 (d = 2.0700) |
| a-TiO$_2$: | (h, k, l) = (1, 0, 1) | 2 theta = 25.2806 (d = 3.5200) |
| r-TiO$_2$: | (h, k, l) = (1, 1, 0) | 2 theta = 27.4460 (d = 3.2470) |

The intensity ratio of the main peaks is computed from 3.51 angstroms (2θ: 25°) of the intensity of the main peak of anatase TiO$_2$, 3.25 angstroms (2θ: 27°) of the intensity of the main peak of rutile TiO$_2$, and 2.07 angstroms (2θ: 43°) of the intensity of main peak of Li$_2$TiO$_3$ which were determined on condition that the peak intensity of 4.44 angstroms (2θ: 20°) which is the main peak of Li$_2$Ti$_3$O$_7$ is taken as 100.

A half value width of the X-ray diffraction peak of a diffraction angle (2θ) at 20° was computed, and the crystallite diameter was derived from the Scherrer's equation (Equation 1) provided below. Computation of a half value width of a diffraction peak involves a necessity for making a correction to a line width of an optical system of the diffraction apparatus. Standard silicon powder was used for the correction.

$$D_{hkl}=(K\cdot\lambda)/(\beta\cdot\cos\theta) \quad \text{(Equation 1)}$$

$D_{hkl}$: a crystallite diameter (angstrom)
λ: Wavelength of X-ray for measurement (angstrom)
β: Spread of a diffraction angle
θ: Bragg angle of the diffraction angle
K: Constant (0.9)

<Method for measuring an average particle size>

An average particle size was measured by use of a laser diffraction distribution measurement apparatus (Shimadzu SALD-300) by a method of: first adding about 0.1 g of a sample, a surfactant, and 1 to 2 mm of purified water within a test cup; sufficiently stirring the mixture; pouring the mixture into an agitation bath; measuring the distribution of luminous intensity 64 times at intervals of two seconds; and analyzing data pertaining to the distribution of particles.

<Manufacture of the Negative Electrode>

90 wt % of the obtained lithium titanium composite oxide powder, 5 wt % of coke (d$_{002}$ is 0.3465 nm, and an average particle size of 3 μm) which was fired at 1,200° C. and which was used as a conductive agent, and 5 wt % of polyvinylidene difluoride (PVdF) were added to N-methylpyrrolidinone (NMP) and mixed together, to thus form a slurry. The slurry was applied over both surfaces of the collector formed from an aluminum foil having a thickness of 15 μm and subjected to drying and pressing, whereupon a positive electrode having electrode density of 2.0 g/cm$^3$.

<Manufacture of an Electrode Group>

The positive electrode, the separator formed from a polyethylene porous film having a thickness of 25 μm, the negative electrode, and the separator were stacked sequentially, and a resultant layers were helically coiled. The thus-coiled electrodes were subjected to heat press at 60° C., thereby manufacturing an oblate electrode group having a width of 30 mm and a thickness of 3.0 mim. The thus-obtained electrode group was housed in a pack formed from a laminate film of 0.1 mm thick that was formed from an aluminum foil having a thickness of 40 micrometers and polypropylene layers formed over both surfaces of the aluminum foil, and the thus-housed group was subjected to vacuum drying at 80° C. for 24 hours.

<Preparation of Liquid Nonaqueous Electrolyte>

1.5 mol/L of LiBF$_4$ serving as an electrolyte was dissolved into a mixed solvent formed from a mixture of ethylene carbonate (EC) and γ-butyrolactone (GBL) at a 1:2 volume ratio, thereby preparing a liquid nonaqueous electrolyte.

After the liquid nonaqueous electrolyte was poured into the laminate film pack housing the electrode group, the pack was completely sealed by heat sealing. Thus, a nonaqueous electrolytic secondary battery having the structure shown in FIG. 1, a width of 35 mm, a thickness of 3.2 mm, and a height of 65 mm was manufactured.

Examples 2 Through 8

Nonaqueous electrolytic secondary batteries were manufactured in the same manner as was the secondary battery of the first embodiment except that the amount of K to be added was set to amounts described in Table 1.

Examples 9 Through 16

Nonaqueous electrolytic secondary batteries were manufactured in the same manner as was the secondary battery of the first embodiment except that phosphorus pentaoxide was used as a raw material and that the amount of P to be added was set to amounts described in Table 1.

Examples 17 Through 19

Nonaqueous electrolytic secondary batteries were manufactured in the same manner as was the secondary battery of the first embodiment except that sodium hydrate was used as a raw material and that the amount of Na to be added was set to amounts described in Table 1.

Examples 20 Through 22

Nonaqueous electrolytic secondary batteries were manufactured in the same manner as was the secondary battery of the first embodiment except that boron oxide was used as a raw material and that the amount of B to be added was set to amounts described in Table 1.

Examples 23 Through 27

Nonaqueous electrolytic secondary batteries were manufactured in the same manner as was the secondary battery of the first embodiment except that potassium hydrate and phosphorus pentaoxide were used as raw materials and that amounts of K and P to be added were set to amounts described in Table 1 and that firing temperatures was set those described in Table 1.

Comparative Examples 1 Through 8

Nonaqueous electrolytic secondary batteries were manufactured in the same manner as those in the first embodiment except that no additive was used and that the firing temperature was set to those described in Table 1.

In relation to Examples 1 through 27 and Comparative Examples 1 through 8, input values were measured for five seconds. The maximum electric current which can be caused to flow into the battery adjusted to SOC 50% for five seconds in a charging direction was determined. There was determined electric power (W) at which the maximum product of an electric current and a final voltage (2.8 V) is obtained. A value determined by dividing the thus-obtained power by the amount of weight of the battery was taken as a value to be input for five seconds. Acquired results are shown in Table 1.

By a mono-electrode test in which a counter electrode is formed from lithium metal, electric capacity of the negative electrode was measured. A counter electrode was formed from lithium metal, and the amount of electricity of the negative electrode acquired when lithium ions were absorbed (recharged) up to 1 V (Li/Li$^+$) at an electric current of 0.1 mA/cm$^2$ was converted into the amount of electricity per unit weight of lithium titanate serving as a negative electrode active material. The thus-converted values are provided side by side in Table 1 as negative electrode capacity.

the lithium titanium composite oxide and the nonaqueous electrolyte battery of the present examples are understood to exhibit a superior heavy-current characteristic.

When compared with Example 8, Example 7 exhibits greater negative electrode capacity and produces a larger output. Further, when compared with Example 16, Example 15 exhibits greater negative electrode capacity and produces a larger output. Consequently, 3 wt % or less of the additional element (B, Na, P, or K) relative to the weight of the lithium titanium composite oxide are understood to be preferable.

When compared with the case of Examples 1 through 8 doped with K, smaller crystallite diameters and higher outputs were generally acquired in connection with Examples 9 through 16 doped with P. Accordingly, P is understood to be most preferable as an element to be added.

TABLE 1

| | Firing temperature (° C.) | K content (wt %) | P content (wt %) | Na content (wt %) | B content (wt %) | Crystallite size (Å) | Main peak intensity ratio | | | Output value (W/kg) | Negative electrode capacity (mAh/g) |
|---|---|---|---|---|---|---|---|---|---|---|---|
| | | | | | | | Anatase TiO$_2$ | Rutile TiO$_2$ | Li$_2$TiO$_3$ | | |
| Example 1 | 1000 | 0.011 | <0.002 | <0.002 | <0.002 | 675 | <1 | 3 | <1 | 1185 | 196 |
| Example 2 | 1000 | 0.078 | <0.002 | <0.002 | <0.002 | 660 | <1 | 3 | <1 | 1212 | 197 |
| Example 3 | 1000 | 0.108 | <0.002 | <0.002 | <0.002 | 649 | <1 | 2 | <1 | 1233 | 196 |
| Example 4 | 1000 | 0.276 | <0.002 | <0.002 | <0.002 | 618 | <1 | 2 | <1 | 1294 | 196 |
| Example 5 | 1000 | 0.589 | <0.002 | <0.002 | <0.002 | 621 | <1 | 2 | <1 | 1288 | 195 |
| Example 6 | 1000 | 1.087 | <0.002 | <0.002 | <0.002 | 602 | <1 | 2 | <1 | 1329 | 195 |
| Example 7 | 1000 | 2.931 | <0.002 | <0.002 | <0.002 | 543 | <1 | 2 | <1 | 1473 | 194 |
| Example 8 | 1000 | 5.231 | <0.002 | <0.002 | <0.002 | 550 | <1 | 3 | <1 | 987 | 178 |
| Example 9 | 1000 | <0.002 | 0.010 | <0.002 | <0.002 | 548 | <1 | 3 | <1 | 1460 | 197 |
| Example 10 | 1000 | <0.002 | 0.059 | <0.002 | <0.002 | 540 | <1 | 2 | <1 | 1481 | 197 |
| Example 11 | 1000 | <0.002 | 0.102 | <0.002 | <0.002 | 501 | <1 | 2 | <1 | 1597 | 196 |
| Example 12 | 1000 | <0.002 | 0.297 | <0.002 | <0.002 | 494 | <1 | 2 | <1 | 1619 | 196 |
| Example 13 | 1000 | <0.002 | 0.512 | <0.002 | <0.002 | 470 | <1 | 2 | <1 | 1685 | 195 |
| Example 14 | 1000 | <0.002 | 1.030 | <0.002 | <0.002 | 441 | <1 | 2 | <1 | 1714 | 194 |
| Example 15 | 1000 | <0.002 | 2.912 | <0.002 | <0.002 | 410 | <1 | 3 | <1 | 1751 | 192 |
| Example 16 | 1000 | <0.002 | 5.432 | <0.002 | <0.002 | 444 | <1 | 3 | <1 | 964 | 174 |
| Example 17 | 1000 | <0.002 | <0.002 | 0.011 | <0.002 | 703 | <1 | 3 | <1 | 1138 | 195 |
| Example 18 | 1000 | <0.002 | <0.002 | 0.112 | <0.002 | 684 | <1 | 2 | <1 | 1170 | 194 |
| Example 19 | 1000 | <0.002 | <0.002 | 1.033 | <0.002 | 631 | <1 | 2 | <1 | 1268 | 195 |
| Example 20 | 1000 | <0.002 | <0.002 | <0.002 | 0.010 | 551 | <1 | 3 | <1 | 1418 | 195 |
| Example 21 | 1000 | <0.002 | <0.002 | <0.002 | 0.101 | 529 | <1 | 2 | <1 | 1456 | 193 |
| Example 22 | 1000 | 0.309 | <0.002 | <0.002 | 1.039 | 487 | <1 | 2 | <1 | 1512 | 191 |
| Example 23 | 1100 | 0.309 | 0.202 | 0.020 | <0.002 | 801 | <1 | 5 | <1 | 1021 | 196 |
| Example 24 | 1050 | 0.309 | 0.202 | 0.020 | <0.002 | 714 | <1 | 4 | <1 | 1120 | 196 |
| Example 25 | 1000 | 0.309 | 0.202 | 0.020 | <0.002 | 651 | <1 | 3 | <1 | 1229 | 197 |
| Example 26 | 970 | 0.309 | 0.202 | 0.020 | <0.002 | 608 | <1 | 2 | <1 | 1316 | 197 |
| Example 27 | 940 | 0.309 | 0.202 | 0.020 | <0.002 | 654 | <1 | 3 | <1 | 1418 | 196 |
| Comparative Example 1 | 1100 | <0.002 | <0.002 | <0.002 | <0.002 | 1521 | <1 | 20 | <1 | 426 | 120 |
| Comparative Example 2 | 1050 | <0.002 | <0.002 | <0.002 | <0.002 | 1320 | <1 | 14 | <1 | 521 | 124 |
| Comparative Example 3 | 1000 | <0.002 | <0.002 | <0.002 | <0.002 | 1226 | <1 | 12 | <1 | 542 | 127 |
| Comparative Example 4 | 970 | <0.002 | <0.002 | <0.002 | <0.002 | 804 | <1 | 11 | 2 | 568 | 130 |
| Comparative Example 5 | 940 | <0.002 | <0.002 | <0.002 | <0.002 | 781 | <1 | 11 | 4 | 586 | 134 |
| Comparative Example 6 | 900 | <0.002 | <0.002 | <0.002 | <0.002 | 740 | 3 | 10 | 6 | 561 | 130 |
| Comparative Example 7 | 850 | <0.002 | <0.002 | <0.002 | <0.002 | 661 | 10 | 9 | 6 | 484 | 120 |
| Comparative Example 8 | 800 | <0.002 | <0.002 | <0.002 | <0.002 | 606 | 20 | 7 | 8 | 354 | 98 |

As show in Table 1, when compared with Comparative Examples 1 through 8, Examples 1 through 27 have smaller amounts of impurity phases and exhibit greater negative electrode capacity. Accordingly, the lithium titanium composite oxide and the nonaqueous electrolyte battery of the present examples are understood to have high capacity. In addition, when compared with Comparative Examples 1 through 8, Examples 1 through 27 produce high outputs. Consequently, <Large Current Characteristic>

Examples 28 to 31

Nonaqueous electrolytic secondary batteries were manufactured in the same manner as in Examples 3 through 6 except that LiNi$_{1/3}$Co$_{1/3}$Mn$_{1/3}$O$_2$ was used for the positive electrode active material.

Under the previously-described method, the value input to the thus-manufactured batteries for five seconds were measured. Results of the measurement are provided in Table 2.

TABLE 2

|  | Output value (W/kg) |
|---|---|
| Example 28 | 1480 |
| Example 29 | 1550 |
| Example 30 | 1545 |
| Example 31 | 1604 |

Examples 28 through 31 shown in Table 2 provide outputs higher than those provided in Examples 3 through 6 shown in Table 1. Accordingly, further-enhanced input performance can be understood to be achieved by use of $LiNi_{1/3}Co_{1/3}Mn_{1/3}O_2$ for the negative electrode active material.

<High-Temperature Storage Test>

Examples 32 Through 35

Nonaqueous electrolytic secondary batteries were manufactured in the same manner as in Example 3 except that the composition of the solvent of the electrolyte was set as compositions provided in Table 3. (DMC: dimethyl carbonate, MEC: methylethyl carbonate, and DEC: diethyl carbonate)

The nonaqueous electrolytic secondary batteries of Examples 3 and 32 to 35 were stored in a fully-charged state at 45° C. in a thermostatic bath (Thermostatic Bath: Hitachi, Model No. EC-45MTP). Remaining capacity of the batteries achieved after elapse of one month was measured. A proportion of remaining capacity to service capacity achieved before storage of the batteries is provided side by side in Table 3.

TABLE 3

|  | First solvent/A | Second solvent/B | Solvent proportion (A:B) | Remaining capacity/ service capacity (%) |
|---|---|---|---|---|
| Example 3 | EC | GBL | 1:2 | 82 |
| Example 32 | EC | PC | 1:2 | 78 |
| Example 33 | EC | DMC | 1:2 | 60 |
| Example 34 | EC | MEC | 1:2 | 61 |
| Example 35 | EC | DEC | 1:2 | 63 |

Example 3 and Example 32 show remaining capacity which is greater than that achieved in Examples 33 through 35. Accordingly, it is understood that enhanced high-temperature storage characteristics can be achieved by inclusion of a mixed solvent containing a mixture of at least two types of solvents selected from the group consisting of propylene carbonate (PC), ethylene carbonate (EC), and γ-butyrolactone (GBL).

When compared with Example 32, Example 3 exhibits greater service capacity. Accordingly, it is seen that the high-temperature storage characteristic can be enhanced further by inclusion of γ-butyrolactone (GBL).

<Large-Current Characteristic>

Examples 21 and 36 to 38, Reference Example 1

There were manufactured nonaqueous electrolytic secondary batteries (Examples 36 to 38) identical with that of Example 21 exclusive of use the negative electrode where the lithium titanium composite oxide—which contains ramsdellite as a principal phase and which was used in Example 21—and a lithium titanium composite oxide—which includes spinel as the principal phase and which will be described later—were mixed in predetermined proportions (provided in Table 4).

A nonaqueous electrolytic secondary battery (Reference Example 1) identical with Example 21 exclusive of employment of the positive electrode using the spinel lithium titanium composite oxide as the negative electrode active material was manufactured (see JP-A-2005-141146 filed by the present inventors).

In connection with the spinel lithium titanium composite oxide employed herein, In X-ray diffraction, when the main peak intensity of the spinel lithium titanate was taken as 100, the main peak intensity of rutile $TiO_2$, that of anatase $TiO_2$, and that of $Li_2TiO_3$ were less than 1. Further, the crystallite diameter of the lithium titanate composite oxide achieved at that time was 694 angstroms. Further, the average particle size of the lithium titanium composite oxide was 0.82 μm.

Examples 23 and 39

There was manufactured a nonaqueous electrolytic secondary battery (Reference Example 39) identical with Example 23 exclusive of employment of the negative electrode where the lithium titanium composite oxide—which contains ramsdellite as a principal phase and which was used in Example 23—and a lithium titanium composite oxide—which includes spinel as the principal phase and which will be described later—were mixed in predetermined proportions (provided in Table 4).

The spinel lithium titanium composite oxide employed herein is the same as that mentioned previously.

The main peak intensity ratio of the mixed lithium titanium composite oxide was further measured by use of the foregoing method. When a total of the main peak of the ramsdellite lithium titanate and the main peak intensity of the spinel lithium titanate in X-ray diffraction was taken as 100, the main peak intensity of rutile $TiO_2$, that of anatase $TiO_2$, and that of $Li_2TiO_3$ were measured. The main peak of $Li_4Ti_5O_{12}$ was 4.83 angstroms (2θ: 18°).

By the previously-described output evaluation method, output values produced at SOC 8% were measured by use of the manufactured batteries. Further, in connection with the thus-manufactured nonaqueous electrolytic secondary batteries, 1 C charge and 1 C discharge were repeated at a battery voltage ranging from 1.8 V to 2.7 V in an environment of 45° C. until a capacity maintenance ratio reached 80%. Results are provided in Table 4.

TABLE 4

|  |  |  | Main peak intensity ratio | | | | |
|---|---|---|---|---|---|---|---|
|  | Weight Ratio $Li_2Ti_3O_7$:$Li_4Ti_5O_{12}$ | Main peak intensity ratio $Li_2Ti_3O_7$:$Li_4Ti_5O_{12}$ | Anatase $TiO_2$ | Rutile $TiO_2$ | $Li2TiO_3$ | Output value (W/kg) | Cycle performance (Number of times) |
| Example 21 | 100:0 | 4450:0 | <1 | 2 | <1 | 2035 | 2000 |
| Example 36 | 90:10 | 4000:450 | <1 | 2 | <1 | 1998 | 2600 |

TABLE 4-continued

| | Weight Ratio $Li_2Ti_3O_7:Li_4Ti_5O_{12}$ | Main peak intensity ratio $Li_2Ti_3O_7:Li_4Ti_5O_{12}$ | Main peak intensity ratio Anatase $TiO_2$ | Rutile $TiO_2$ | $Li_2TiO_3$ | Output value (W/kg) | Cycle performance (Number of times) |
|---|---|---|---|---|---|---|---|
| Example 37 | 50:50 | 2230:2250 | <1 | <1 | <1 | 1897 | 3400 |
| Example 38 | 10:90 | 450:4000 | <1 | <1 | <1 | 1833 | 3500 |
| Reference Example 1 | 0:100 | 0:4500 | <1 | <1 | <1 | 1423 | 3500 |
| Example 23 | 100:0 | 4500:0 | <1 | 5 | <1 | 1427 | 2100 |
| Example 39 | 90:10 | 4100:450 | <1 | 5 | <1 | 1401 | 2600 |

As shown in Table 4, Examples 21 and 36 through 38 exhibit output characteristics which are superior to that exhibited by Reference Example 1. Accordingly, the output performance of the nonaqueous electrolytic secondary battery using the negative electrode containing the ramsdellite lithium titanium composite oxide is understood to be superior to the output performance of the nonaqueous electrolytic secondary battery using only the spinel lithium titanium composite oxide. The main peak intensity ratio of rutile $TiO_2$ of the lithium titanium composite oxide of Example 21 is two. The value is greater than that of Reference Example 1; however, the output characteristic of Example 21 is still greater. This is considered to be ascribable to the unique effect of the ramsdellite lithium titanium composite oxide.

Examples 37 and 38 exhibit superior values in connection with the output characteristic and the cycle characteristic. Accordingly, the ratio of the main peak intensity of ramsdellite lithium titanate to the main peak intensity of spinel lithium titanate in X-ray diffraction is understood to preferably range from 1:9 to 5:5.

Although the embodiments of the present invention have been described above, the present invention is not limited to these embodiments and is variously modified within the scope of the gist of the present invention described in the appended claims. The present invention can also be modified variously within the scope of the gist of the present invention in practical stages. Moreover, various inventions can be created by appropriate combinations of the plurality of constituent elements disclosed in the embodiments.

What is claimed is:

1. A nonaqueous electrolyte battery comprising:
a negative electrode including a lithium titanium composite oxide showing an X-ray diffraction pattern in which each of main peak intensities of rutile $TiO_2$, anatase $TiO_2$ and $Li_2TiO_3$ is 5 or less with respect to a main peak intensity of ramsdellite lithium titanate of 100; a positive electrode; and
a nonaqueous electrolyte,
wherein the lithium titanium composite oxide includes at least one element selected from the group consisting of B, Na, and K.

2. The nonaqueous electrolyte battery according to claim 1, wherein the lithium titanium composite oxide shows an X-ray diffraction pattern in which each of main peak intensities of rutile $TiO_2$, anatase $TiO_2$ and $Li_2TiO_3$ is 3 or less with respect to a main peak intensity of ramsdellite lithium titanate of 100.

3. The nonaqueous electrolyte battery according to claim 1, wherein the lithium titanium composite oxide includes the at least one element in an amount of 0.01 to 5 wt %.

4. The nonaqueous electrolyte battery according to claim 1, wherein the at least element is segregated on an interface of a crystallite of the lithium titanium composite oxide.

5. The nonaqueous electrolyte battery according to claim 1, wherein the lithium titanium composite oxide has a crystallite diameter of 80.1 nm or less.

6. The nonaqueous electrolyte battery according to claim 1, wherein the nonaqueous electrolyte includes a mixture solvent of two or more selected from the group consisting of propylene carbonate, ethylene carbonate, and y-butyrolactone.

7. The nonaqueous electrolyte battery according to claim 1, wherein the nonaqueous electrolyte includes y-butyrolactone.

8. A nonaqueous electrolyte battery comprising:
a negative electrode including a lithium titanium composite oxide showing an X-ray diffraction pattern in which each of main peak intensities of rutile $TiO_2$, anatase $TiO_2$ and $Li_2TiO_3$ is 5 or less with respect to a total of main peak intensities of ramsdellite lithium titanate and spinel lithium titanate of 100;
a positive electrode; and
a nonaqueous electrolyte,
wherein the lithium titanium composite oxide includes at least one element selected from the group consisting of B, Na, and K.

9. The nonaqueous electrolyte battery according to claim 8, wherein a ratio of the main peak intensity of ramsdellite lithium titanate to the main peak intensity of spinel lithium titanate falls within a range from 1:9 to 5:5.

10. A lithium titanium composite oxide showing an X-ray diffraction pattern in which each of main peak intensities of rutile $TiO_2$, anatase $TiO_2$ and $Li_2TiO_3$ is 5 or less with respect to a main peak intensity of ramsdellite lithium titanate of 100,
wherein the lithium titanium composite oxide includes at least one element selected from the group consisting of B, Na, and K.

11. A battery pack comprising a plurality of nonaqueous electrolytic batteries, each of the nonaqueous electrolyte batteries includes:
a negative electrode including a lithium titanium composite oxide showing an X-ray diffraction pattern in which each of main peak intensities of rutile $TiO_2$, anatase $TiO_2$ and $Li_2TiO_3$ is 5 or less with respect to a main peak intensity of ramsdellite lithium titanate of 100; a positive electrode; and
a nonaqueous electrolyte,
wherein the lithium titanium composite oxide includes at least one element selected from the group consisting of B, Na, and K.

12. A battery pack comprising a plurality of nonaqueous electrolytic batteries, wherein each of the nonaqueous electrolyte batteries includes:
a negative electrode including a lithium titanium composite oxide showing an X-ray diffraction pattern in which each of main peak intensities of rutile $TiO_2$, anatase $TiO_2$ and $Li_2TiO_3$ is 5 or less with respect to a total of main peak intensities of ramsdellite lithium titanate and spinel lithium titanate of 100;
a positive electrode; and
a nonaqueous electrolyte,
wherein the lithium titanium composite oxide includes at least one element selected from the group consisting of B, Na, and K.

* * * * *